J. MEYERS.
WIND OPERATED REVOLVING SIGN.
APPLICATION FILED DEC. 15, 1909.
963,165.
Patented July 5, 1910.
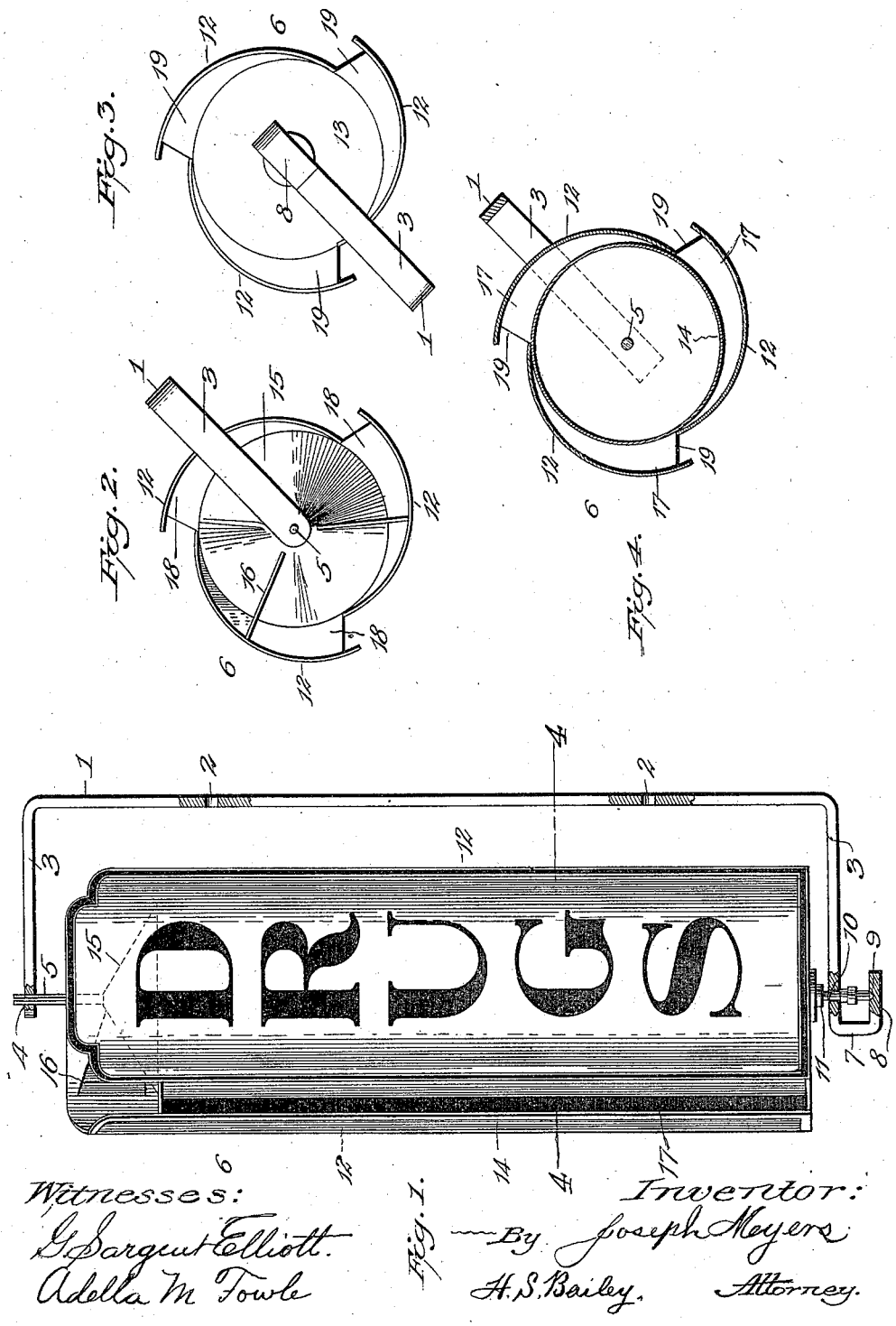

UNITED STATES PATENT OFFICE.

JOSEPH MEYERS, OF DENVER, COLORADO.

WIND-OPERATED REVOLVING SIGN.

963,165.  Specification of Letters Patent.  Patented July 5, 1910.

Application filed December 15, 1909. Serial No. 533,217.

*To all whom it may concern:*

Be it known that I, JOSEPH MEYERS, a citizen of the United States of America, residing in the city and county of Denver and State of Colorado, have invented a new and useful Wind-Operated Revolving Sign, of which the following is a specification.

My invention relates to improvements in wind actuated revolving signs, and the object of my invention is to provide a revolving sign in which a series of involute shape curved blades are arranged to form a curved wind catching space between them that permits the sign to be rotated by a very slight wind, and in which the outside surfaces of these curved blades are used to display sign and advertising letters, words or symbols. I attain these objects by the mechanism illustrated in the accompanying drawings, in which:

Figure 1 is a side elevation of my improved revolving sign. Fig. 2 is a plan view of Fig. 1. Fig. 3 is a lower end plan view; and Fig. 4 is a cross section on line 4—4 of Fig. 1.

Similar letters of reference refer to similar parts throughout the several views.

Referring to the drawings, the numeral 1 designates the supporting bracket of my improved sign. This bracket is provided with apertures 2, by which it may be hung on hooks, nails or pins, or be secured by screws to the front walls of stores out of doors where the wind will have free access to it. This supporting bracket is provided with right angled end portions 3, which are bent to stand parallel to each other but at opposite ends of the bracket, and the upper end is provided with an aperture 4, through which the upper end of the axial spindle 5 of the sign extends loosely. This spindle extends entirely through a sign 6, and is revolubly supported in the bracket in the following manner: The lower angled end of the support is bent to form a double bearing for the lower end of the spindle. This double bearing is formed by bending the end of the lower member down at right angles to itself, as shown at 7, and then again bending a portion of the part 7 in to form a short horizontal arm 8, which is parallel with the lower angled end 3, and this arm 8 forms a bearing for the lower end of the spindle 5. This end bearing may be of any suitable character, but I preferably form it by tapering the lower end of the spindle and forming a correspondingly tapered recess 9 in the top surface of the said arm 8 of the supporting bracket.

A journal bearing 10 is formed through the lower angled end 3 of the bracket, in line with the tapered bearing 9, through which the spindle projects loosely enough to rotate therein.

The lower portion of the spindle is threaded, and a nut 11 is threaded onto and is turned tight to the bottom plate 13 of the sign 6.

The sign 6 comprises a plurality of involute curved wind catching blades 12 arranged in slightly overlapping order at their ends and secured upon a cylindrical shell 14 of any suitable metal or material, preferably tin or sheet iron, which forms the body of the sign, and which is closed by a plate or disk at each end. The top disk 15 is preferably made in the form of a cone, and the top ends of the blades preferably extend above its peripheral rim portion, and a brace arm 16 extends from the top surface of the cone to each of the wind catching blades. The lower ends of these wind catching blades are preferably terminated even with the bottom head disk 13. The inner ends of these wind catching blades 12 are all secured to the cylindrical body 14, and each blade curves outward from the cylinder in an involute form of a curve, and each blade extends to and its outer end overlaps the inner or rear end of the adjacent blade and stands at a short distance from it, thus leaving a recess 17 between each blade and the cylindrical body 14, into which the wind blows and drives the sign revolubly in the pivotal bearings of its spindle.

At the top and bottom portion of the sign brace plates 18 and 19 respectively extend from the cylinder to the blades. These plates are also of an involute form of a curve, and consequently form a curved wedge, and a curved space of the same form as these plates is formed between the body of the cylinder and the inside surface of the blades throughout the entire length of the sign between its opposite end brackets. Consequently, the wind enters a deep tapering recess between the blades and the cylinder that extends around the body of the cylinder, and a very slight wind is all that is necessary to rotate the sign.

The sign is preferably made considerably longer than its diameter, and the outside surface of the involute curved wind catching blade presents a large curved surface upon which sign letters, words or symbols may be placed by painting them upon their surfaces or by any other suitable means, the word "drugs" being illustrated on one side to illustrate the application of sign words to the blades.

The sign is preferably supported in a vertical position and the sign letters and words are consequently arranged vertically on the blades, but, if desired, the sign and its supporting bracket can be positioned and secured in a horizontal or in an oblique position.

My invention is simple, attractive, inexpensive to construct and a slight wind will keep it revolving.

Having described my invention, what I claim as new and desire to secure by Letters Patent is:

In a wind actuated sign, the combination of a suitable supporting bracket provided with angled end portions registering in alinement with each other, with a spindle revolubly journaled in said angled end portions, a cylindrical body provided with heads secured to said spindle, and a plurality of overlapping curved blades secured at one end to said cylindrical body and arranged to curve away from it in an involute form of curve far enough to overlap the inner end portion of the adjacent blade and to form a wind entering curved and tapering shaped recess between said blades and the body of said cylinder, a conical top portion on said cylinder, brackets secured at one end to said conical top and extending to and secured to the inside of said curved blades, and brace plates of involute form secured to and extending from said curved blades to and secured to said cylinder at the base of said cylinder's conical top portion, the outside surfaces of said blades being of sufficient width and length to receive sign letters and expose them to view.

In testimony whereof I affix my signature in presence of two witnesses.

JOSEPH MEYERS.

Witnesses:
G. SARGENT ELLIOTT,
ADELLA M. FOWLE.